United States Patent [19]
Müller et al.

[11] Patent Number: 5,344,212
[45] Date of Patent: Sep. 6, 1994

[54] OPPOSING PASSENGER-INFANT SEAT SYSTEM

[75] Inventors: Hans-Jürgen Müller, Henstedt-Ulzburg; Wilfried Sprenger, Issendorf, both of Fed. Rep. of Germany

[73] Assignee: Deutsche Airbus GmbH, Hamburg, Fed. Rep. of Germany

[21] Appl. No.: 926,796

[22] Filed: Aug. 6, 1992

[30] Foreign Application Priority Data

Aug. 6, 1991 [DE] Fed. Rep. of Germany ....... 4125959

[51] Int. Cl.⁵ .............................................. A47C 1/08
[52] U.S. Cl. ...................................... 297/245; 297/14; 297/250.1; 297/254
[58] Field of Search ................... 297/245, 250, 254, 14

[56] References Cited

U.S. PATENT DOCUMENTS

| | | | |
|---|---|---|---|
| 3,515,431 | 6/1970 | Grady | 297/250 |
| 4,033,622 | 7/1977 | Boudreau | 297/250 |
| 4,460,215 | 7/1984 | Chamberlain et al. | 297/14 |
| 4,541,654 | 9/1985 | Jonasson | 297/254 X |
| 4,615,560 | 10/1986 | Schaller | 297/254 X |
| 4,915,446 | 4/1990 | Darling et al. | 297/250 |
| 4,993,666 | 2/1991 | Baymak et al. | 297/14 X |
| 5,118,163 | 6/1992 | Brittian et al. | 297/254 X |
| 5,156,436 | 10/1992 | Grene | 297/250 |

FOREIGN PATENT DOCUMENTS

| | | | |
|---|---|---|---|
| 170116 | 2/1986 | European Pat. Off. | 297/14 |
| 1937610 | 2/1971 | Fed. Rep. of Germany | 297/254 |
| 1416441 | 12/1975 | United Kingdom | 297/254 |
| 8500563 | 2/1985 | World Int. Prop. O. | 297/216 |

Primary Examiner—Peter M. Cuomo
Assistant Examiner—Suzanne L. Dino
Attorney, Agent, or Firm—Anderson Kill Olick & Oshinsky

[57] ABSTRACT

An opposing passenger-infant seat system for public transportation such as aircraft is disclosed, wherein an infant seat is near a passenger seat. The passenger seat is suitable for receiving an adult. The infant seat and the adult seat are arranged to be essentially facing each other. The infant seat is attached typically to an aircraft cabin partition by an adapter and is installed in a plane above the seat cushion of the adult seat. A space is provided between the infant seat and the adult seat which is smaller than the average length of a human arm.

8 Claims, 3 Drawing Sheets

OPPOSING PASSENGER-INFANT SEAT SYSTEM

FIELD OF THE INVENTION

The present invention is directed to infant seats and more particularly to the construction of an infant seat near a passenger seat in public transportation, such as aircraft.

BACKGROUND OF THE INVENTION

Various modes of transportation, particularly air carriers are not well suited for providing seats for adult passengers, as well as for infants, in such a way as to facilitate the caring and supervision of infants. When children are held in a passenger's lap during a flight, this may be uncomfortable for both the child and the adult, particularly during long flights. Furthermore, placing a child in a passenger seat is not economical and, more importantly, may be dangerous in case of strong turbulence or worse dangers. Furthermore, caring for the child, even from an adjacent seat, may be difficult, particularly when the adjacent passenger is wearing a safety belt. Moreover, an infant in an adjacent passenger seat may feel uncomfortable in unfamiliar surroundings when, for example, looking straight ahead and not to the caretaker in the adjacent seat.

It is therefore an object of the present invention to provide a seat system in a transportation carrier which permits a passenger to monitor and attend to an infant while the carrier is moving.

Yet another object of the invention is to provide a seat system which is comfortable for both an infant and an adult caretaker.

An additional object of the invention is to provide a passenger-infant seat system in which the infant seat is interchangeable.

SUMMARY OF THE INVENTION

These and other objects of the invention, which shall become apparent hereafter, are achieved by the present opposing passenger infant seat system, comprising an infant seat, an adult seat located substantially opposite the infant seat, wherein the infant seat is fastened above a plane of the seating surface of a passenger seat to an adapter on typically a partition of an aircraft cabin. The infant seat is positioned at a distance less than the length of an average human arm from the passenger seat. By this arrangement, a passenger may observe and monitor an infant seated in the infant seat and face him. The infant would therefore have continuous visual contact with the passenger and therefore would not feel abandoned by surroundings which are unfamiliar. During takeoff and landings, in particular, this can be significant since during those phases of the flight, the infant is exposed to many unaccustomed events and requires particular solicitude. The present system additionally improves the travel comfort of other passengers traveling on the same flight and also helps reduce noise by an infant because, for example, the infant is facing a familiar passenger.

BRIEF DESCRIPTION OF THE DRAWINGS

The invention will be better understood by the Detailed Description of the Preferred Embodiment in conjunction with the drawings, of which.

DETAILED DESCRIPTION OF THE PREFERRED EMBODIMENT

Figure 1:
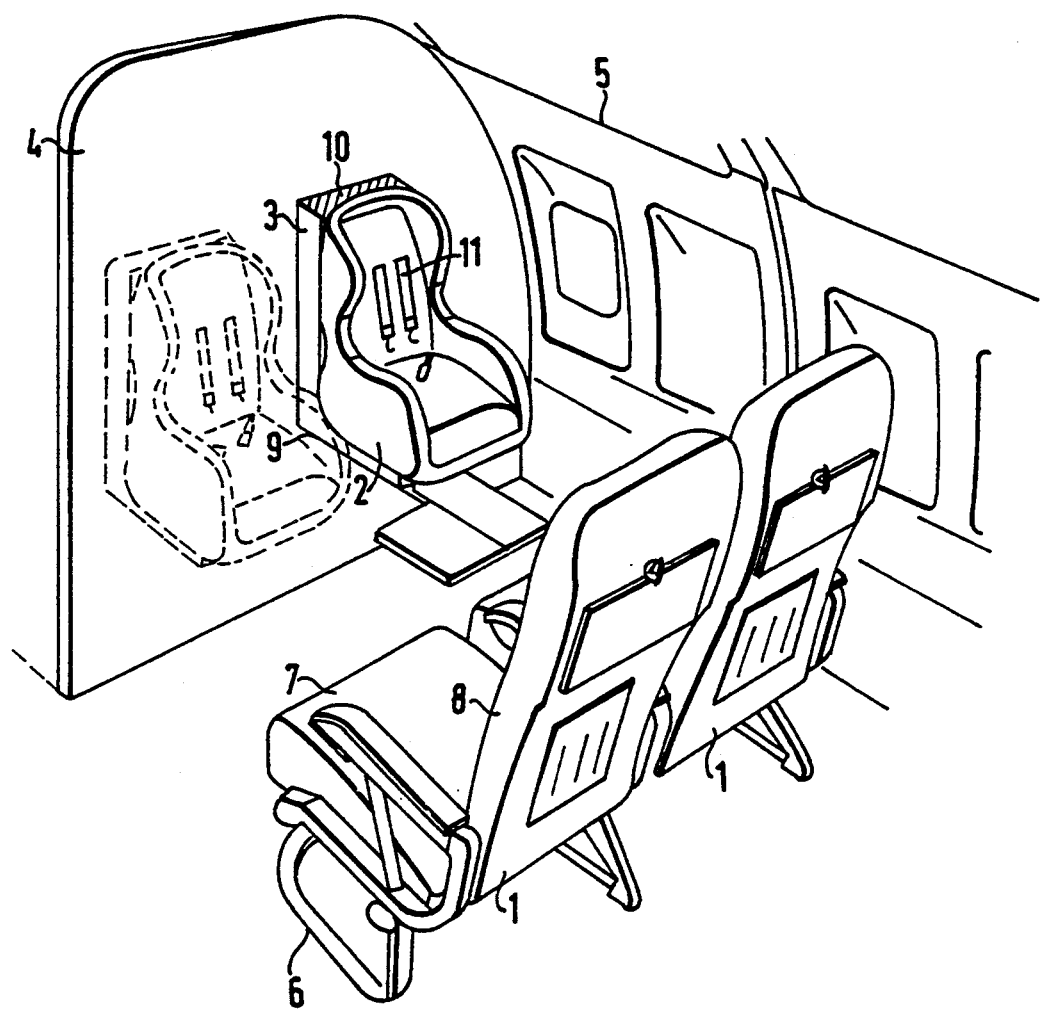
FIG. 1 is a perspective view of an opposing passenger-infant seat system in an aircraft cabin.

Reviewing now the drawings, wherein like numerals represent like elements throughout the several views, FIG. 1 shows the present opposing passenger- infant seat system, comprising adult seats 1 and infant seats 2. The infant seats 3 are installed on a partition 4 of an aircraft cabin 5 via an adapter 3. It is, of course, possible to use, as a partition or wall 4, a separation wall or a partition bounding a storage cabinet or a galley or toilet wall.

Each adult seat 1 comprises a frame 6, a seating surface or a seat cushion 7 and a backrest 8. An increase of the operational security is achieved by providing one of the adult seats with a safety belt having preferably a three-point attachment feature. This three-point attachment safety belt helps avoid the impact of the head or the upper torso of the adult person upon the infant seat or the adapter in the course of sudden braking, acceleration or other movements of the aircraft.

The infant seat adapter 3 in the region of partition 4 extends essentially above a plane defined by the seat cushion 7 and forms an angular shape suitable for receiving the infant seat 2. The adapter has a support 9 and a backrest faring 10. To make economical fabrication possible, as well as for adaptation to differing requirements, the adapter 3 may be formed of a support extending in a horizontal direction and a backrest arranged perpendicularly thereto, as well as comprising a receptacle for standardized seats. The adapter 3 can be slid sideways into the mounts in order to assure a rapid and economical installation. The support 9 extends in a horizontal direction and the backrest faring 10 is perpendicular thereto.

Figure 2:
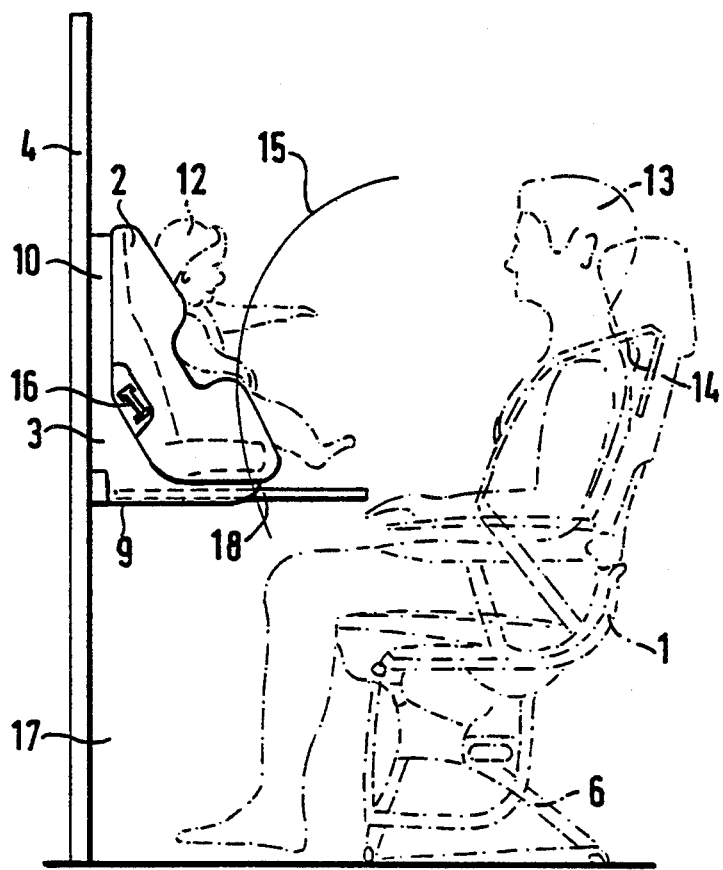
FIG. 2 is a side view of the opposing passenger-infant seat system, depicting a passenger and an infant.

The infant seat 2 has safety belts 11 for the safety of the occupant. As depicted in FIG. 2, a child 12, as well as an adult 13, are seated in their respective seats 2. The adult 13 is retained by a safety belt 14 which preferably has a three-point attachment.

The infant seat 2 has a spacing from the adult seat 1 which is smaller than the average length of a human arm relative to the adult seat 1, assuring that the infant seat 2 is located sufficiently near (i.e., within handling radius 15) to permit handling by the seated adult passenger 13.

The infant seat 2 is connected to the adapter 3 by belt 16 which engages the infant seat 2 similarly, as do, for instance, motor vehicle safety belts. Such construction permits the use of standardized infant seats which are available comparatively economically in various embodiments.

The attachment of the infant seat 2 by the adapter 3 on a partition 4 renders possible the use of various types of infant seats 2, such as those provided for infants of different ages. By installing the adapter 3 in a plane above the seating surface 7 of the adult seat 1, the visual contact of the adult 13 and the infant 12 is improved and storage space 17 is created beneath the infant seat, which can, for instance, be used for leg clearance. The sizing of the distance between the infant seat 2 and the adult seat 1 enables the adult 13 to establish bodily contact with the child 12 at any time, without having to rise from the seat 1.

A table element 18 in a lower region of the adapter 3 is displaceably supported in the region of the adapter 3 and can be pulled out of the adapter 3 if required for use and can be pushed back into the same. This table 18 can be used, for instance, for depositing reading material, food or children's toys. If it is unused, the table 18 can be pushed into the adapter 3, thus creating a sufficiently large freedom of movement.

Figure 3:
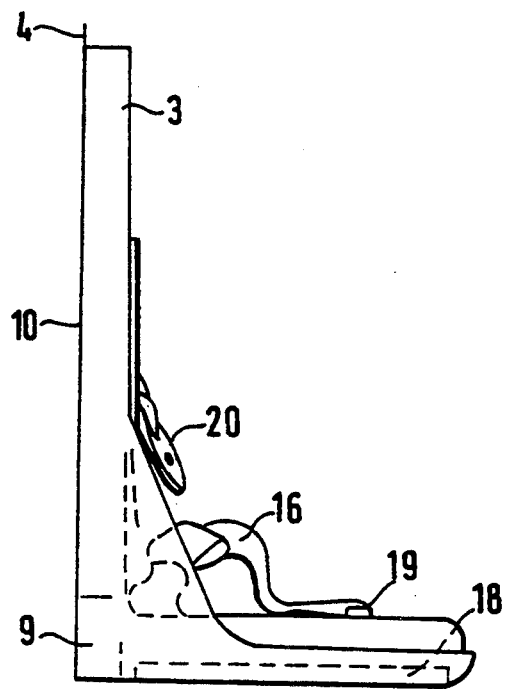
FIG. 3 is a side view of an adapter of the system of FIG. 1, with the infant seat removed.

A magnified illustration of an adapter 3 on the partition 4 is depicted in side view in FIG. 3, however with the infant seat 2 removed from the adapter 3 so that the belt 16 is visible. The belt 16 may be engaged by its end buckle 19 and a receiving element 20.

Figure 4:
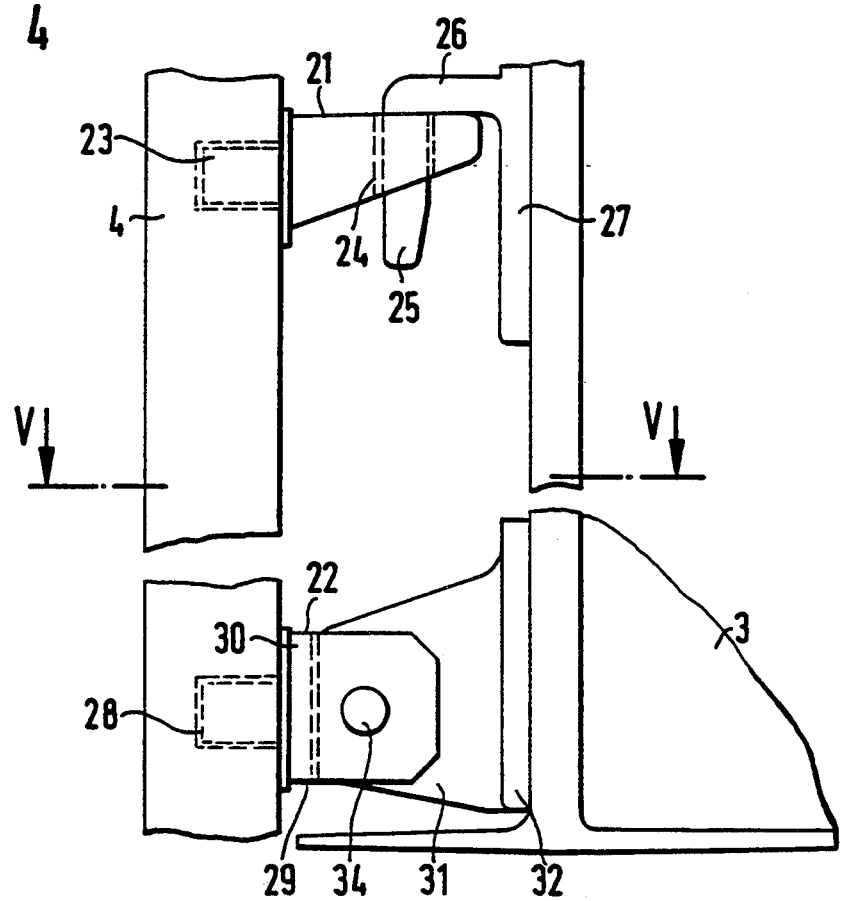
FIG. 4 is a plan view of the adapter of the system secured on the partition.
Figure 5:
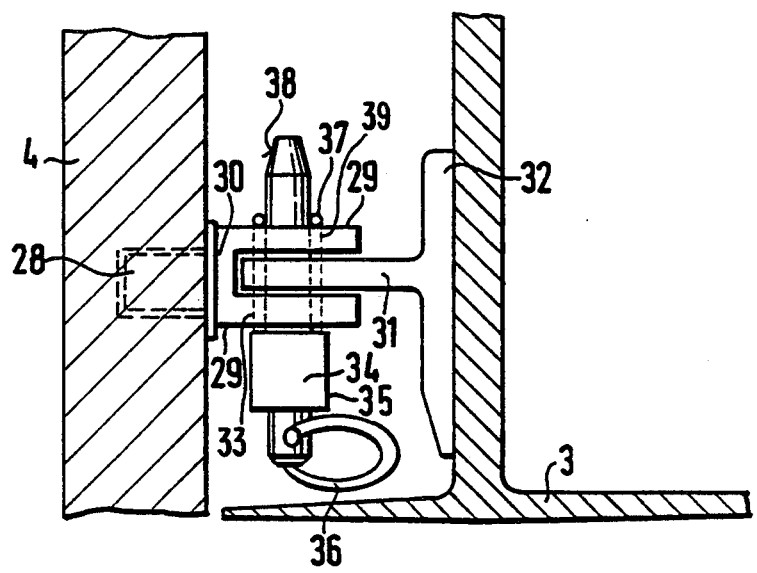
FIG. 5 is a partial illustration of a cross-section along the line v-V in FIG. 4.

As seen in FIG. 4, in plan view, mountings 21 and 22 for attaching the adapter 3 are on the partition 4. Mounting 21 engages with lug 23 into the partition 4 and has a bore 24 in the region, externally from the partition 4. The bore 24 extends vertically and receives a latch 25 connected by a tie rod 26 with a basic element 27 retaining or holding the adapter 3. The mounting 22 is fixed in the partition 4 by a lug 28 and comprises two horizontal plates 29 and is connected by a transverse web 30, together forming a U-shaped profile. A retention web 31 is guided between plates 29 and is connected with a basic element 32 which holds or retains the adapter 3. A bore 33, through which protrudes the safety lug 34 extends through the plates 29 and the transverse web 30 (see FIG. 5).

The safety lug 34 has a stop 35, as well as a handling ring 36, which facilitates its manipulation. The safety lug 34 is provided with a flexural or spring element 37 for securing the safety lug 34 in the bore 33. This flexural element 37 is pressed into the safety lug 34 upon its introduction into the bore 33 and is again pressed out of the safety lug 34 when it is pulled out of the bore 33, thus preventing the safety lug 34 from sliding out of the bore The safety lug 34 is provided with a bevel 38, on one of its ends, in order to facilitate introduction into the bore. The bore 33 has a chamfer 39 in order to facilitate insertion of the flexural or spring element 37. The ease of handling can furthermore be improved by arranging a handling ring on one end of the safety lug.

While the preferred embodiment of the invention has been illustrated in detail, modifications and adaptations may be made to the invention without departing from the spirit and scope of the invention, as delineated in the following claims.

We claim:

1. An opposing passenger-infant seat system for a transportation carrier having a partition means, said passenger-infant seat system comprising:
    an adult seat having a seating surface;
    a removable infant seat located opposite said adult seat above a plane of said seating surface of said adult seat and at a distance from said adult seat wherein said distance is less than an average length of a human arm; and
    an adapter for attaching said infant seat to the partition means of the carrier, wherein said adapter includes a substantially horizontally extending support and a backrest arranged perpendicularly to said support for receiving said infant seat, and a belt for securing said infant seat to said adapter.

2. The opposing passenger-infant seat system of claim 1, wherein the adapter is detachably fastened by at least two mountings to a partition.

3. The opposing passenger-infant seat system of claim 2, wherein one of said at least two mountings comprises:
    a bore extending essentially in a vertical direction;
    a latch received in said bore;
    a tie rod; and
    a basic element fixedly attached to the backrest, wherein said latch has a spacing from the adapter, essentially defined by said tie rod.

4. The opposing passenger-infant seat system of claim 3, wherein another of said at least two mountings comprises:
    plates forming a U-profile;
    a transverse web;
    a retention web between the plates; ad
    at least one safety lug extending through the plates and the retention web.

5. The opposing passenger-infant seat system of claim 4, further comprising a flexural element securing said safety lug against sliding in the installed state.

6. The opposing passenger-infant seat system of claim 5, further comprising a handling ring on an end of the safety lug in order to improve handling during positioning of said safety lug.

7. The opposing passenger-infant seat system of claim 6, wherein one of the adult seats is equipped with a safety belt having a three-point attachment.

8. The opposing passenger-infant seat system of claim 7, further comprising a table element in the infant seat in a lower region of said seat, wherein said table element is guided to be placeable in the support.

* * * * *